Sept. 15, 1942.　　　D. D. WOLFE　　　2,296,133
HOLDER
Filed Dec. 4, 1939　　　2 Sheets-Sheet 1

INVENTOR
Daniel D. Wolfe
BY Alfred R. Fuchs
ATTORNEY

Sept. 15, 1942.  D. D. WOLFE  2,296,133
HOLDER
Filed Dec. 4, 1939     2 Sheets-Sheet 2
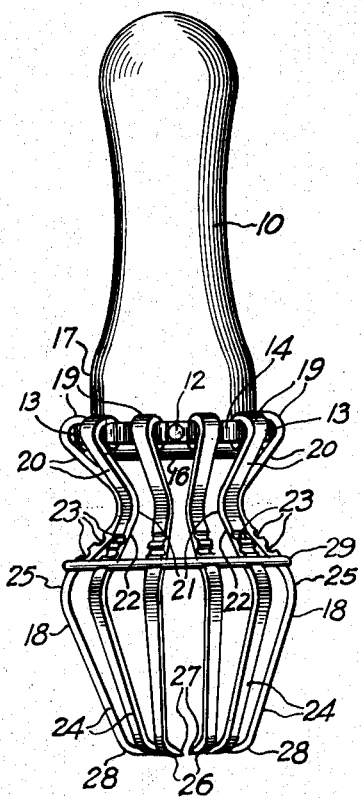
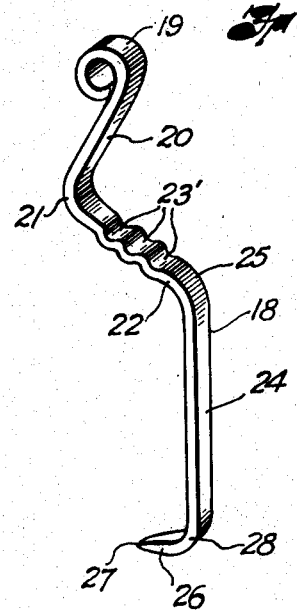
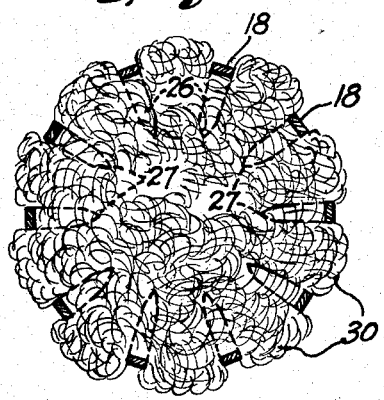
INVENTOR
Daniel D. Wolfe
BY Alfred R. Fuchs
ATTORNEY Patented Sept. 15, 1942

2,296,133

UNITED STATES PATENT OFFICE 2,296,133

HOLDER

Daniel D. Wolfe, Kansas City, Mo.

Application December 4, 1939, Serial No. 307,453

4 Claims. (Cl. 15—209)

My invention relates to holders for cleansing materials, such as steel wool, sponge, metal fabric pads, sponge rubber pads, or any suitable cloth-like member.

It is a purpose of my invention to provide a device of the above mentioned character, which is provided with a handle and with holding members mounted on the handle, so as to grip a cleansing member, such as above referred to, between the same, said holding members forming a reservoir for a reserve supply of the cleansing material, which, preferably, extends axially of the handle beyond the gripping members, so as to provide a portion thereof for active use, that extends endwise beyond the gripping members, which can be replenished from the supply within a cage-like member formed by the gripping members.

It is a further purpose of my invention to provide a device of the above mentioned character, in which an annular series of hook-like gripping members is provided that have prongs at one end thereof that engage the cleansing material, which, if of steel wool, metal fabric, or of a spongy or elastic character, will be compressible so that the portion thereof within the cage-like body portion formed by the annular series of gripping members will be compressed by said gripping members and will project between the same, so as to extend laterally beyond said gripping members, thus partially burying the gripping members within said material so that the same will not come in contact accidentally with the article that is being cleansed.

It is a further purpose of my invention to provide a device of the above mentioned character, in which said annular series of gripping members is pivotally mounted on the handle member by means of a ring-like member having off-sets therein forming pivot, or hinge, pins for the pivot eye provided on one end of each of the gripping members, and to provide means cooperating with said gripping members, in the form of a ring-like member that is confined between the hinge members and an outwardly inclined portion of the gripping members, which adjustably limits the expansion of the gripping members, so that these will be held confined to a position in which the same firmly grip the compressible material within the cage-like body portion formed by said gripping members. Preferably, the ring-like member is held in adjusted position relative to the gripping members by engagement in recesses, or grooves, provided in said gripping members, which may be formed by either providing a series of cut away portions, or notches, therein, or by crimping or corrugating the gripping member to provide a series of such recesses, or grooves.

Other objects and advantages of my invention will appear as the description of the drawings proceeds. I desire to have it understood, however, that I do not intend to limit myself to the particular details shown or described, except as defined in the claims.

In the drawings:

Fig. 3 is a similar view, showing the gripping members in their most contracted position.

Fig. 6 is a section taken on the line 6—6 of Fig. 1.

Fig. 7 is a perspective view of a modified form of gripping member, and

Fig. 8 is a perspective view of a further modified form of gripping member.

Figure 1:
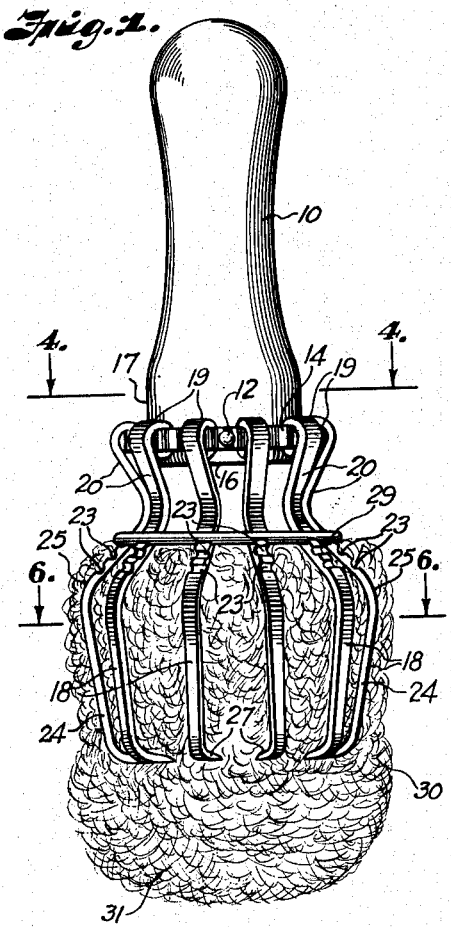
Fig. 1 is an elevational view of my improved holder showing a wad, or pad, of cleansing material mounted in position therein.

Referring in detail to the drawings, my improved holder comprises a handle 10, which may be of any desired size and shape found to be convenient for use, and which is, preferably, made of wood or similar material. Mounted on said handle is a ring-like member 11, the same being secured to said handle by any suitable fastening elements, such as the headed members 12, any desired number thereof to firmly secure the ring-like member 11 in position on the handle 10 being used. It will be noted that the ring-like member 11 is crimped, or corrugated, so as to provide outwardly projected portions 13 alternating with portions 14 that engage with the side face of the handle 10. Said ring-like member 11 is made of a band of sheet metal of suitable character. Preferably, the ring-like member is made from a pre-formed strip of sheet metal of a continuous character, which is cut into suitable lengths and the ends brought together as indicated at 15, and secured in ring-like form by one of the headed elements 12 engaging both ends at the joint, such manufacture of the ring-like elements of narrow strips of sheet metal of great length greatly reducing the cost of manufacture.

The ring-like member 11 is placed as near the substantially flat end 16 of the handle member 10 as practicable, and it will be obvious that when said ring-like member is in position, hinge members, or pivot ears 13, are provided that are outwardly offset from the adjacent surface 17 of the handle member 10. Mounted pivotally on said member 11 at the pivot portions 13 is an annular series of gripping members 18, that collectively form an annular cage-like member.

Each of said members 18 is provided with a hinge eye 19 at one end thereof that is pivotally mounted on one of the hinge formations 13 on the ring-like member 11. When said members 18 are in position on said ring 11 the same are equally spaced around the handle member 10 and are so positioned that straight portions 20 on each thereof extend inwardly toward each other, when the members 18 are in expanded position, as shown in Fig. 2, said straight portions 20 terminating in a curved portion 21 that joins with an outwardly inclined portion 22 on each of said members, which is provided with a series of recesses 23, which are made, in the form of the invention shown in Figs. 1 to 3, inclusive, by cutting away part of the material of the sheet metal members 18.

Said outwardly inclined portion 22 of each member 18 is joined with a straight portion 24 thereof, by means of a curved portion 25 and said straight portion 24 terminates in an inwardly directed tapered prong 26, providing a sharp point 27 at the extremity thereof, said prongs 26 being connected with the straight portions 24 by curved portions 28. A ring-like member 29 embraces the annular series of members 18 between the straight portions 24 and the hinge eyes 19 and is made of such size as to be confined in place on the cage-like member thus formed after the parts are assembled. This can either be accomplished by placing the ring-like member 29 in position after the same has been completed and before the pivot eyes 19 are assembled with the member 11, or the member 29 can be placed on the cage-like body portion of the holder in a split condition and the ends brazed or welded together to form an endless ring after being placed in position as shown.

Figure 2:
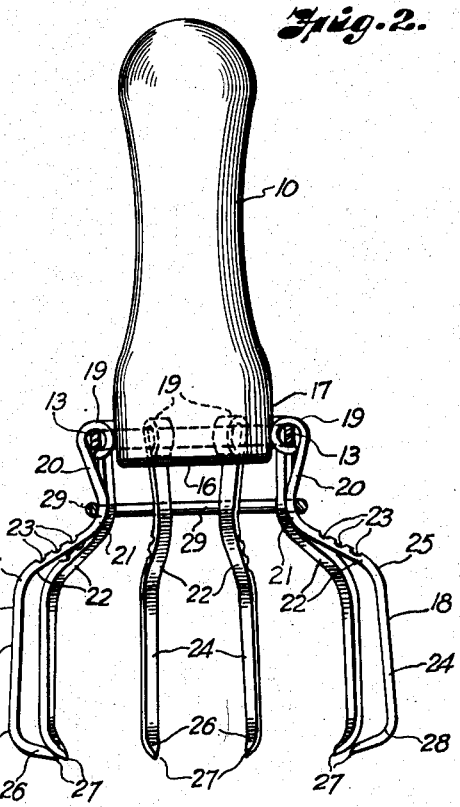
Fig. 2 is a view similar to Fig. 1, showing the gripping members in expanded position before a pad has been placed in position therebetween.

It will be obvious that when the ring-like member 29 is in the position shown in Fig. 2 the members 18 can be expanded to the position shown in Fig. 2, so that a pad, or wad, or mass, of cleansing material of an abrasive nature, or of a spongy character, such as indicated by the numeral 30, can be placed in position between said gripping members 18 within the cage-like body portion formed thereby, with a portion 31 of said material extending outwardly beyond the prongs 26, so that when the gripping members 18 are swung to the position shown in Fig. 1, by engagement of the ring 29 with one of the recesses, or grooves, 23 of each of the members 18, said points 27 will be firmly embedded in the material 30 to hold the same in position with the portion thereof formed by the part 31 projecting endwise beyond the members 18, and with the members 18 seated in groove-like formations created in the material 30 due to the fact that said material is compressed by means of the members 18 when the ring-like member 29 is in said notches 23, so that some of the material 30 will project laterally beyond the members 18 at the straight portions thereof, as clearly shown in Fig. 6 to thus prevent engagement of the members 18 with an article that is scoured by means of the material that is in the holder. The material can be steel wool or other similar turnings of metal, or a metal fabric, such as the well known cleansing pads that are on the market, or a sponge rubber, or other sponge-like member, or a member of cloth or other similar woven material, as may be found desirable. The pad or wad of material must, however, be of a deformable character or so that it can be compressed and engaged by the prongs to firmly hold the abrasive, or other cleansing material, in position on the holder by means of said prongs, and by means of the gripping members engaging therewith at the sides of the mass of material that is confined within the cage-like body portion formed by said gripping members.

Said cage-like body portion acts as a reservoir for the material 30, as will be evident from Fig. 1, and while substantially the entire cage-like body portion can be filled with said material, it must, of course, not be packed into the portion adjacent the handle so tightly that the ring-like member cannot function for adjusting the pivoted gripping members. As the material is used, it can be pulled out so as to provide a forwardly projecting mass 31 until substantially all the material has been used up that was within the reservoir provided by the cage-like body portion of the holder. Of course, in order to facilitate this movement of the material 30, it is desirable to always disengage the ring-like member 29 from the particular set of grooves 23 within which the same is mounted, to thus release the material from the gripping action of the members 18. It will be obvious that when said ring-like member 29 is moved to the position shown in Fig. 3, a very small mass of the material 30 can be held between the prongs 26, as the points thereon will be almost in engagement with each other and also the cage-like body portion will be so reduced that the straight portions 24 will also be in engagement with said material until it is almost used up, so as to further aid in holding said material in position in the holder.

Figure 4:
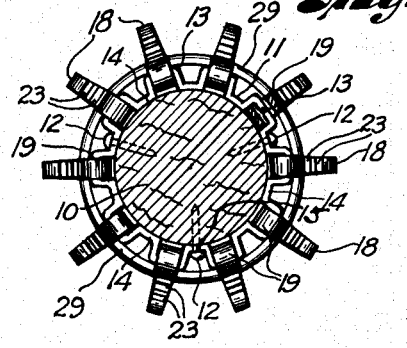
Fig. 4 is a section taken on the line 4—4 of Fig. 1, partly broken away.
Figure 5:
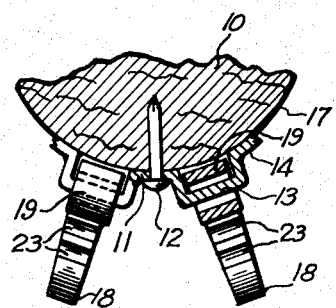
Fig. 5 is a fragmentary enlarged sectional view, partly broken away.

Instead of making the gripping members as shown in Figs. 1 to 3, inclusive, the same can be made as shown in Fig. 7 in which, instead of providing the notches 23 by cutting away some of the material of the gripping member, these can be formed by crimping, or corrugating, a part of the otherwise straight portion 22, to form a series of grooves 23' therein. While it is at present preferred to make the gripping members of sheet metal and to gradually taper the same lengthwise, as will be clear from Figs. 4 and 5, it may be desirable to make the same of wire of suitable gauge, as shown in Fig. 8, said gripping members being of substantially the same shape as previously described and operating in the same manner, in the form shown, the grooves 23' being formed by corrugating, or crimping, the wire in a similar manner to that of the sheet metal in Fig. 7. However, in order that the gripping members 18' shown in Fig. 8 will function properly in their pivotal movements about the pivot members 13, the stock from which the same are made is flattened at one end to form the eye 19 that engages around the pivot member 13, thus preventing any rocking of said gripping members on the pivot members 13, holding the same in proper relative position to form substantially equally spaced bars of the cage-like body portion.

What I claim is:

1. In a holder of the character described, a handle having a portion of substantially uniform diameter at and adjacent one end thereof, a metallic ring embracing said portion of said handle near said end, said ring having a series of duplicate equally spaced offsets therein providing an annular series of uniformly spaced pivot bars on said handle spaced therefrom, an annular series of gripping members each having an eye formed at one end thereof engaging one of said bars pivotally, the portions of said ring between said offsets engaging said handle to confine said eyes and hold said gripping members in predetermined spaced relationship in said series, the body portions of said gripping members extending from the sides of said eye portions remote from said handle to permit free swinging movement of said gripping members about the pivotal mounting thereof, each of said gripping members having a portion inclined toward the axis of said handle from the eye thereon, a portion inclined away from said axis extending from said last mentioned portion and having a series of grooves on the surface thereof, a straight portion extending from said grooved portion, and gripping prongs extending toward the axis of said handle from said straight portion, said gripping members collectively forming an unobstructed cage-like receptacle having a neck portion adjacent said handle at one end thereof and said prongs at the other end thereof, and a portion of much greater diameter than said handle therebetween, the spacing of said gripping members in said series being so close as to prevent escape of a pad of compressible material from said receptacle, and an annular member embracing said gripping members engageable with selected grooves of said series to vary the diameter of said receptacle and the spacing of said prongs.

2. The combination with a mass of compressible material of a holder therefor having a portion of substantially uniform diameter at and adjacent one end thereof, a metallic ring embracing said portion of said handle near said end, said ring having a series of duplicate equally spaced offsets therein providing an annular series of uniformly spaced pivot bars on said handle spaced therefrom, an annular series of gripping members each having an eye formed at one end thereof engaging one of said bars pivotally, the portions of said ring between said offsets engaging said handle to confine said eyes and hold said gripping members in predetermined spaced relationship in said series, the body portions of said gripping members extending from the sides of said eye portions remote from said handle to permit free swinging movement of said gripping members about the pivotal mounting thereof, each of said gripping members having a portion inclined toward the axis of said handle from the eye thereon, a portion inclined away from said axis extending from said last mentioned portion and having a series of grooves on the surface thereof, a straight portion extending from said grooved portion, and gripping prongs extending toward the axis of said handle from said straight portion, said gripping members collectively forming an unobstructed cage-like receptacle having a neck portion adjacent said handle at one end thereof and said prongs at the other end thereof, and a portion of much greater diameter than said handle therebetween, said mass of compressible material being principally mounted within said receptacle with a portion thereof projecting axially therebeyond from said prongs, the spacing of said gripping members in said series being so close as to prevent escape of said compressible material from said receptacle, and an annular member embracing said gripping members engageable with selected grooves of said series to vary the diameter of said receptacle and the spacing of said prongs, said gripping members compressing said material within said receptacle to seat therein, said material projecting between said gripping members to prevent rotation of said mass of material relative to said handle.

3. In a holder of the character described, a handle having a portion of substantially uniform diameter at and adjacent one end thereof, a metallic ring embracing said portion of said handle near said end, said ring having a series of duplicate equally spaced offsets therein providing an annular series of uniformly spaced pivot bars on said handle spaced therefrom, an annular series of gripping members each having an eye formed at one end thereof engaging one of said bars pivotally, the portions of said ring between said offsets engaging said handle to confine said eyes and hold said gripping members in predetermined spaced relationship in said series, the body portions of said gripping members extending from the sides of said eye portions remote from said handle to permit free swinging movement of said gripping members about the pivotal mounting thereof, said gripping members collectively forming an unobstructed cage-like receptacle having a neck portion adjacent said handle at one end thereof and inwardly directed prongs at the other end thereof, and a portion of much greater diameter than said handle therebetween, the spacing of said gripping members in said series being so close as to prevent escape of a pad of compressible material from said receptacle, and an adjusting member interengageable with said gripping members to vary the diameter of said receptacle and the spacing of said prongs.

4. The combination with a mass of compressible material of a holder therefor having a portion of substantially uniform diameter at and adjacent one end thereof, a metallic ring embracing said portion of said handle near said end, said ring having a series of duplicate equally spaced offsets therein providing an annular series of uniformly spaced pivot bars on said handle spaced therefrom, an annular series of gripping members each having an eye formed at one end thereof engaging one of said bars pivotally, the portions of said ring between said offsets engaging said handle to confine said eyes and hold said gripping members in predetermined spaced relationship in said series, the body portions of said gripping members extending from the sides of said eye portions remote from said handle to permit free swinging movement of said gripping members about the pivotal mounting thereof, said gripping members collectively forming an unobstructed cage-like receptacle having a neck portion adjacent said handle at one end thereof and inwardly directed prongs at the other end thereof, and a portion of much greater diameter than said handle therebetween, said mass of compressible material being principally mounted within said receptacle with a portion thereof projecting axially therebeyond from said prongs, the spacing of said gripping members in said series being so close as to prevent escape of said compressible material from said receptacle, and an adjusting member inter-engageable with said gripping members to vary the diameter of said receptacle and the spacing of said prongs, said gripping members compressing said material within said receptacle to seat therein, said material projecting between said gripping members to prevent rotation of said mass of material relative to said handle.

DANIEL D. WOLFE.